US010444321B2

(12) United States Patent
Pu et al.

(10) Patent No.: US 10,444,321 B2
(45) Date of Patent: Oct. 15, 2019

(54) METHOD AND SYSTEM TO ESTIMATE THE LOCATION OF A MOBILE DEVICE USING TIME DIFFERENCE OF ARRIVAL IN AN ASYNCHRONOUS WIRELESS NETWORK

(71) Applicant: RED POINT POSITIONING CORPORATION, Brookline, MA (US)

(72) Inventors: Rui Pu, Brookline, MA (US); Georgiy Pekhteryev, Kharkov (UA); Jonathan Horne, Boulder, CO (US)

(73) Assignee: Red Point Positioning Corporation, Boston, MA (US)

( * ) Notice: Subject to any disclaimer, the term of this patent is extended or adjusted under 35 U.S.C. 154(b) by 0 days.

(21) Appl. No.: 14/587,046

(22) Filed: Dec. 31, 2014

(65) Prior Publication Data

US 2015/0185309 A1 Jul. 2, 2015

Related U.S. Application Data

(60) Provisional application No. 61/922,445, filed on Dec. 31, 2013.

(51) Int. Cl.
*G01S 5/06* (2006.01)
*H04W 4/02* (2018.01)
(Continued)

(52) U.S. Cl.
CPC ............ *G01S 5/06* (2013.01); *G01S 13/878* (2013.01); *H04W 4/023* (2013.01); *H04W 64/003* (2013.01)

(58) Field of Classification Search
CPC ....................................................... G01S 5/12
See application file for complete search history.

(56) References Cited

U.S. PATENT DOCUMENTS 3,754,260 A * 8/1973 Poppe, Jr. ............... G01S 1/245
342/390
5,365,516 A * 11/1994 Jandrell ................ G01S 5/0009
340/991
(Continued)

FOREIGN PATENT DOCUMENTS

JP H08-44710 * 7/1994
JP 4068096 B2 3/2008
(Continued)

OTHER PUBLICATIONS

International Search Report and Written Opinion for Application No. PCT/US14/72915, dated Apr. 8, 2015 (12 pages).
(Continued)

*Primary Examiner* — Vladimir Magloire
*Assistant Examiner* — Donald H Braswell
(74) *Attorney, Agent, or Firm* — Foley & Lardner LLP; Christopher J. McKenna

(57) ABSTRACT

A system for locating a mobile device is disclosed. In one embodiment, the system includes a mobile device having a processor and a receiver, and at least three transceiver devices forming a network of transceiver devices. The mobile device and transceivers can transmit a request (REQ) packet by the mobile device; receive the REQ packet by the at least three transceiver devices; transmit, by a first one of the at least three transceiver devices receiving the REQ packet, a response (RSP) packet; and receive by at least some of the at least three transceiver devices the REQ and the RSP packet. The at least three transceiver devices that receive both the REQ and the RSP packet, the system determines a difference in arrival time between receiving the REQ packet and the RSP packet. The system can determine the location of the mobile device based on determined differences in arrival time.

17 Claims, 7 Drawing Sheets

(51) Int. Cl.
*H04W 64/00* (2009.01)
*G01S 13/87* (2006.01)

(56) References Cited

U.S. PATENT DOCUMENTS

| | | | |
|---|---|---|---|
| 6,054,950 A * | 4/2000 | Fontana | G01S 5/06 |
| | | | 342/463 |
| 7,515,578 B2 | 4/2009 | Alizadeh-Shabdiz et al. | |
| 8,948,063 B2 | 2/2015 | Aryan et al. | |
| 2002/0086682 A1 | 7/2002 | Naghian | |
| 2004/0235495 A1 * | 11/2004 | Bar | G01S 5/02 |
| | | | 455/456.1 |
| 2005/0003828 A1 | 1/2005 | Sugar et al. | |
| 2007/0205944 A1 | 9/2007 | Lyons | |
| 2009/0073043 A1 | 3/2009 | Nozaki | |
| 2009/0149132 A1 | 6/2009 | LeFever et al. | |
| 2010/0177681 A1 | 7/2010 | Sahinoglu | |
| 2011/0007669 A1 | 1/2011 | Yoon | |
| 2011/0170463 A1 * | 7/2011 | Aryan | G01S 13/74 |
| | | | 370/281 |
| 2012/0129551 A1 | 5/2012 | Islam | |
| 2013/0137452 A1 * | 5/2013 | Bevan | G01S 5/021 |
| | | | 455/456.1 |
| 2013/0170475 A1 | 7/2013 | Kuehner | |
| 2013/0273938 A1 | 10/2013 | Ng et al. | |
| 2015/0148059 A1 * | 5/2015 | Puthenpura | G01S 5/10 |
| | | | 455/456.1 |
| 2015/0156746 A1 | 6/2015 | Home et al. | |

FOREIGN PATENT DOCUMENTS

| | | |
|---|---|---|
| WO | 2009/151195 A1 | 12/2009 |
| WO | WO-2009/151195 | 12/2009 |

OTHER PUBLICATIONS

Chinese office action for application No. 2014800701387 dated Sep. 29, 2018.

* cited by examiner

METHOD AND SYSTEM TO ESTIMATE THE LOCATION OF A MOBILE DEVICE USING TIME DIFFERENCE OF ARRIVAL IN AN ASYNCHRONOUS WIRELESS NETWORK

CROSS-REFERENCE TO RELATED APPLICATIONS

This application claims priority under 35 U.S.C. § 119(e) to U.S. Provisional Patent Application No. 61/922,445, filed Dec. 31, 2013, the entirety of which is incorporated by reference herein.

FIELD OF THE INVENTION

This invention relates generally to localization systems and more particularly to methods and systems for locating objects wirelessly using time-of-flight information.

BACKGROUND OF THE INVENTION

In many applications, it is desirable or even necessary to estimate the location of an object with a high accuracy. There are many systems that are designed to allow a device to carry out location estimation using radio frequency (RF) signals. E.g., a device can estimate its location using signal strength of received RF signals, such as the method described in U.S. Pat. No. 7,515,578. The angle of arrival of the received signal can also be used for determining the location of the receiver.

The time of flight (TOF), also known as time of arrival (TOA), can also be used for location estimation. In the example shown in FIG. 1, the TOA based location estimation is typically carried out using trilateration, i.e., the location of an object is estimated based on the distances between the object to be estimated and some objects with their position known. Typically, because the target device is not synchronized to the anchor devices, the time of flight needs to be estimated using a round-trip flight time. For example, a first device transmits a first ranging signal first; then, after receiving the first ranging signal, the second device transmits a second ranging signal. The round trip delay is estimated by the first device. Such a technique is often referred to as Two-Way TOA (TW-TOA) and is commonly used in many systems. Unfortunately, TW-TOA requires a large number of transmissions among all nodes and as a results, a TW-TOA based system cannot accommodate many mobile devices. The large number of devices also results in higher power consumption of the nodes.

Alternatively location estimate can be performed using time difference of flight (TDoF), also known as time difference of arrival (TDOA). In an example shown in FIG. 2, a mobile node 102 broadcasts a radio signal and the signal is received by the receivers of all anchor nodes 101 within its range. If we denote the arrival time of the signal to anchor node i and j as $t_i$ and $t_j$ respectively, the time difference of the arrival time $\delta t_{i,j} = t_j - t_i$ is recorded, instead of the absolute time $t_i$ and $t_j$.

The TDOA described above has a significant advantage over TOA, because it only requires the mobile node to transmit once and the anchor nodes only need to receive.

In the system illustrated in FIG. 2, because only the target devices are required to transmit, the system has better efficiency and can admit a larger number of target devices in a single coverage area. However, in prior systems, the target devices were not synchronized and the transmissions may collide. Moreover the anchor nodes need to be synchronized. This synchronization is accomplished by adjusting all of the anchor nodes to a common reference timing source. Typically, a synchronization unit is used to generate the timing reference signal and distributes it to all anchor nodes via cables. A major drawback of such a system is the complexity and subsequently installation cost. It also suffers performance degradation as the density of target devices increases.

SUMMARY OF THE INVENTION

This invention provides methods and systems for localizing a device that transmits radio signals in a wireless network. A device to be targeted broadcasts a first packet to a wireless network; the anchor nodes within the communication range in the wireless receive the packets. Subsequently, one or more anchor nodes transmit a second or additional packets in response to the reception of the first packets. The anchor nodes receive both the first and second packets and estimate the time difference of arrival between the first and the response packets. The location of the device is estimated based on the time differences of arrival.

The invention also provides methods and systems for determining which anchor nodes transmit the response packets. The anchor nodes that receive the first packet from the target device successfully wait for a random period of time and one of the anchor nodes then transmit a second response packet. If an anchor node does not receive the second packet, it then transmits its own response packet.

In one aspect of the invention, a method is provided for locating a mobile device in a system having a plurality of anchor nodes in wireless communication with a plurality of mobile devices. The method includes transmitting a request (REQ) packet by the mobile device; receiving the REQ packet by a plurality of anchor nodes; transmitting, by a first one of the plurality of anchor nodes receiving the REQ packet, a response (RSP) packet; and, receiving by at least some of the anchor nodes the REQ packet and the RSP packet. For anchor nodes that receive both the REQ packet and the RSP packet, the method can then provide for determining a difference in arrival time between receiving the REQ packet and the RSP packet and determining the location of the mobile device based on the determined differences in arrival time.

In another aspect of the invention, a system is provided for locating a mobile device in a network having a plurality of anchor nodes in wireless communication with a plurality of mobile devices. The system includes a mobile device having a processor and a receiver, and at least three transceiver devices forming a network of transceiver devices, each transceiver having a processor and a receiver for sending and receiving communication packets. The mobile device and transceivers are configured to transmit a request (REQ) packet by the mobile device; receive the REQ packet by the at least three transceiver devices; transmit, by a first one of the at least three transceiver devices receiving the REQ packet, a response (RSP) packet; and, receive by at least some of the at least three transceiver devices the REQ packet and the RSP packet. For the at least three transceiver devices that receive both the REQ packet and the RSP packet, the system can determine a difference in arrival time between receiving the REQ packet and the RSP packet; and, determine the location of the mobile device based on the determined differences in arrival time.

The above described method for location a mobile device can include a variety of features or modifications. For example, in some embodiments, the turnaround time between receiving the REQ packet and transmitting the RSP packet is embedded in the RSP packets. In some embodiments the turnaround time between receiving the REQ packet and transmitting the RSP packet is predetermined and not transmitted.

In further embodiments, the transmission of REQ and RSP packets are randomized to avoid collision or the transmission of REQ and RSP packets are deterministically scheduled to avoid collision.

In other embodiments, the identity of the anchor node that transmits the RSP packet can be determined during formation of the network. In still other embodiments, when an anchor node receives a REQ packet, but fails to receive a RSP packet, that anchor node can transmit a RSP packet. In yet another embodiment, transmissions of RSP packets in response to the REQ packet finishes when all anchor nodes that receive the REQ packet have received a RSP packet or transmitted an RSP packet. In yet further embodiments, an estimation of the location of the mobile node can be carried out using least squares algorithm or weighted least squares algorithm.

DETAILED DESCRIPTION OF THE EMBODIMENTS

For ease of explanation, the descriptions below limit the localization to be within two dimensional space, i.e., we assume all devices are located at the same height. A person of ordinary skill in the art can readily extend the design to three dimensions. Note that ToF and ToA are used interchangeably throughout the application.

Figure 1:
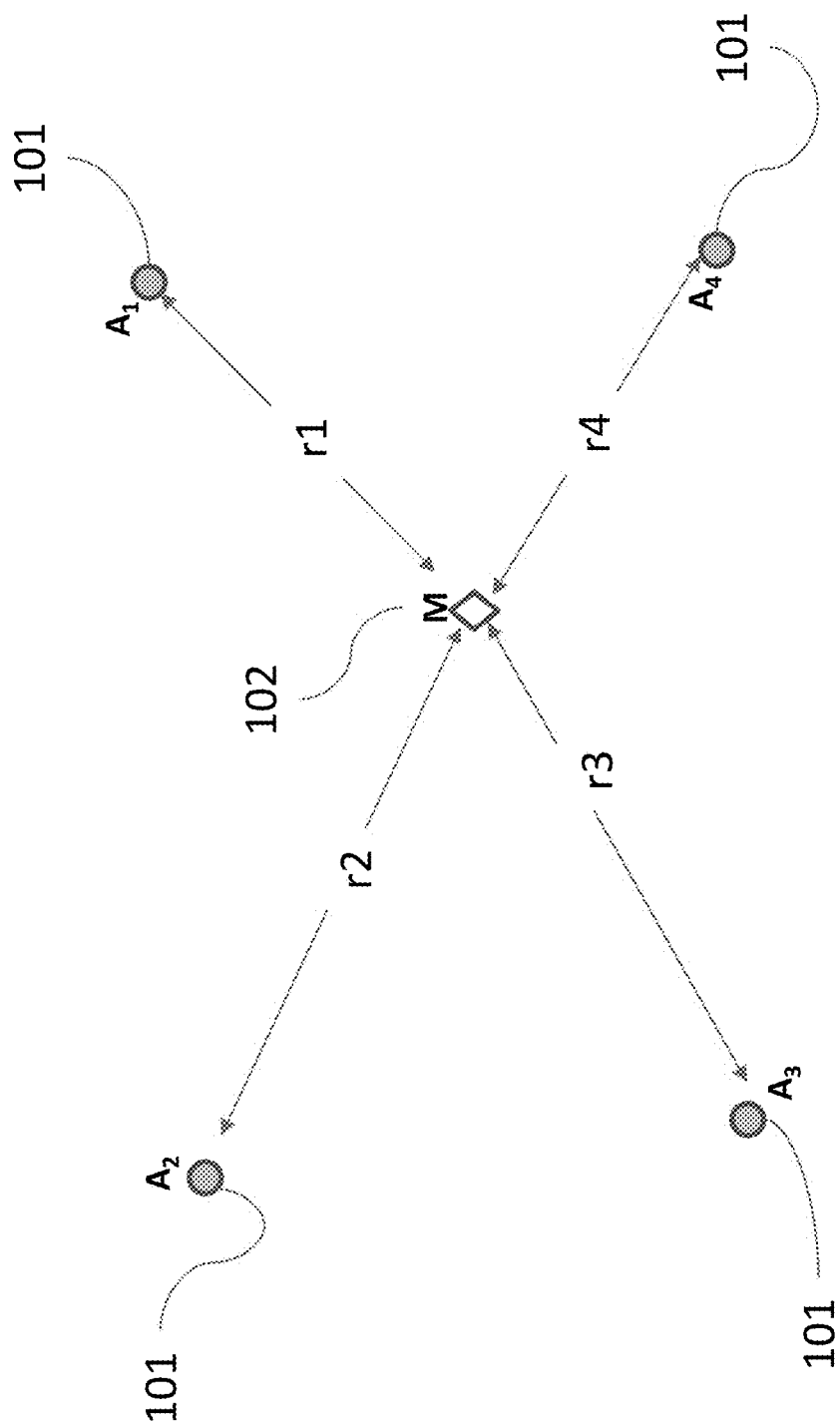
FIG. 1 is an illustration of a localization system using two-way TOA scheme.
Figure 2:
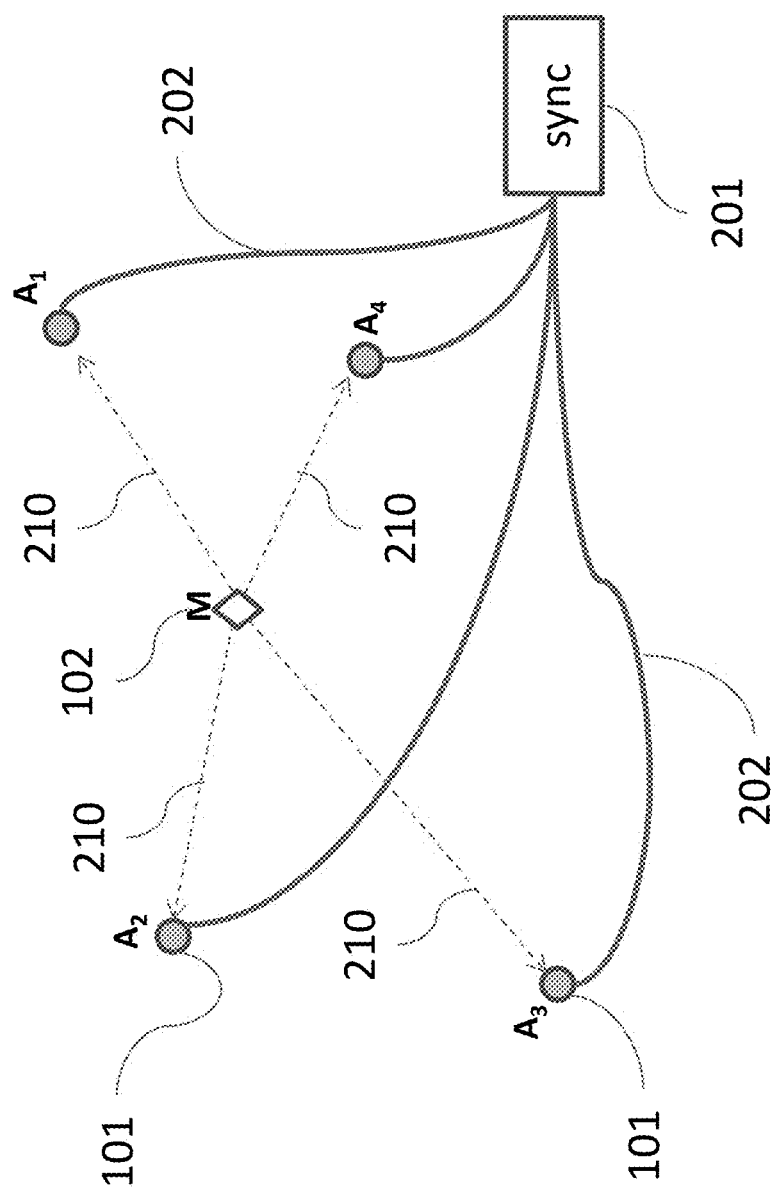
FIG. 2 depicts a TDOA system with synchronization unit.
Figure 3:
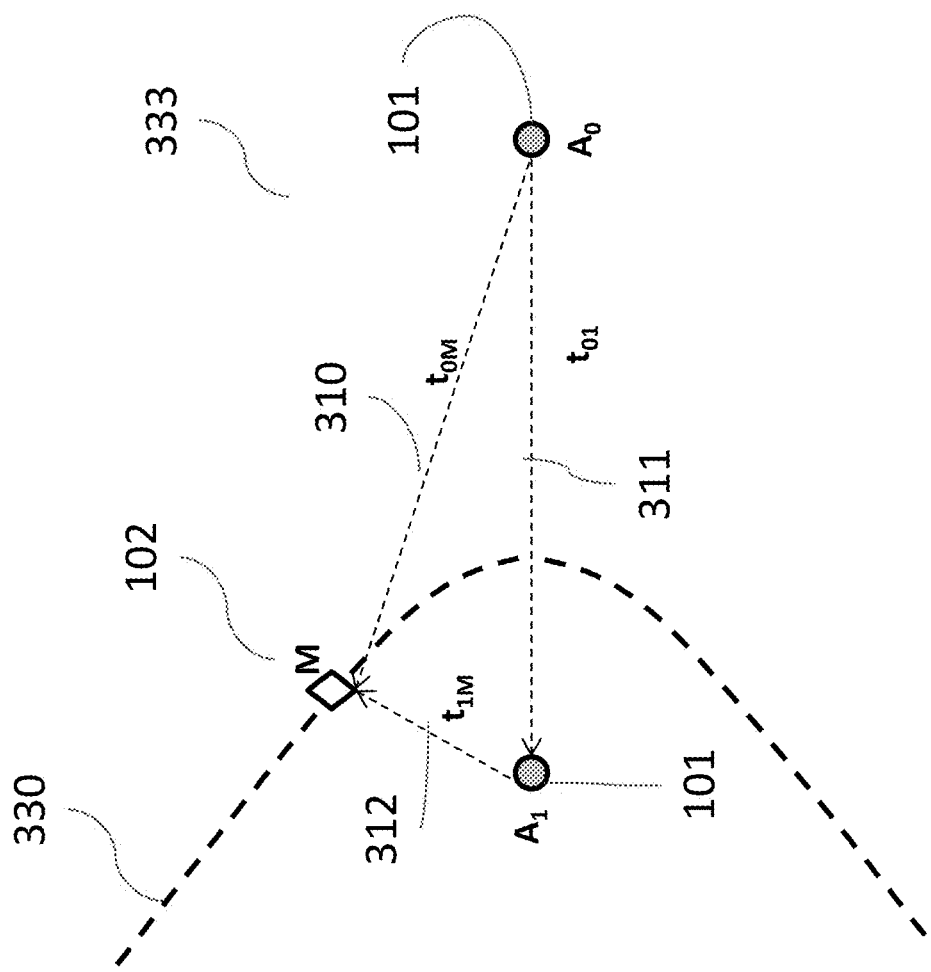
FIG. 3 illustrates the principle of time difference of arrival (TDOA) position estimation with synchronized anchor nodes.

Turning now to FIG. 3, we denote the distance between a fixed device Ai 101 (i.e., a device which location is known) and a target device 102 (i.e., a device which location is unknown, denoted as M) as $r_{im}$. The time of flight (TOF) from Ai to M is $t_{im} = r_{im}/c$, where c is the speed of an electromagnetic wave (~3×10$^8$ m/sec). Conversely, we can compute the distance from the time of flight as $r_{im} = t_{im} * c$.

FIG. 3 illustrates the basic principle of localization using TDoA. Let the distance between nodes be $d_{01}$, $d_{0M}$, $d_{1M}$ respectively and the corresponding flight times be $t_{01}$ 311, $t_{0M}$ 310, $t_{1M}$ 312. If the time difference of flight $\delta t_{01,M} = t_{01} + t_{1M} - t_{0M}$ is given (that is, the difference of the time of flight for two different paths—one path being $A_0$ to $A_1$ to M, and the other being $A_0$ to M), we can find that the mobile device is located on a hyperbolic curve 330.

Figure 4:
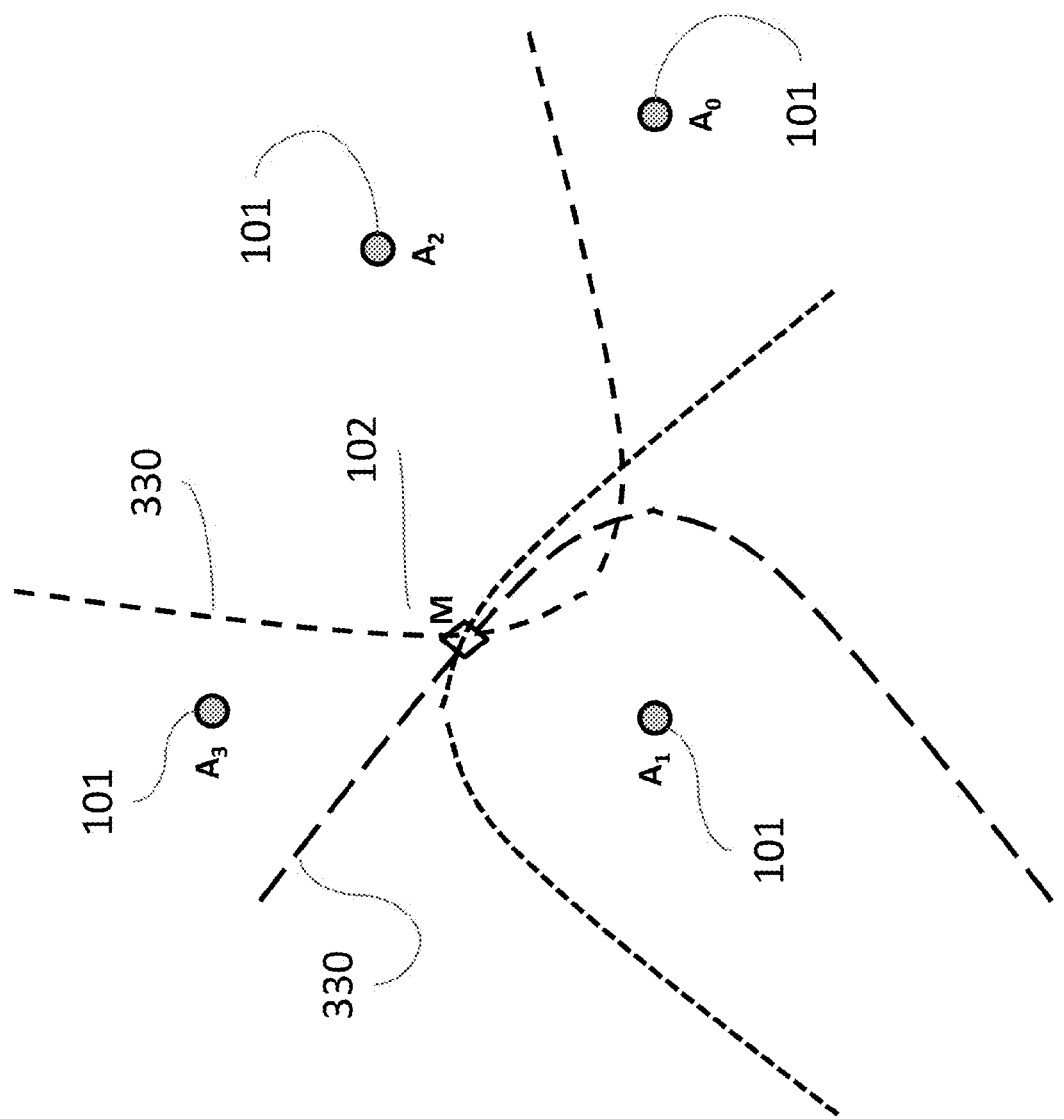
FIG. 4 depicts one embodiment of a TDOA localization method with asynchronous anchor nodes.

If there are more than 3 anchor devices and the TDoAs are known, the location of the mobile node can be determined by finding the intersections of all the hyperbolic curves, as shown in FIG. 4. Often the measurements of time difference can contain noise. As such, algorithms such as maximum likelihood, least squared, weighted least squared and etc. can be used to estimate the mobile node locations and are discussed below.

With reference to FIGS. 3 and 4, TDoA for differential paths based on retransmission by anchor node pairs can also be calculated as discussed in U.S. patent application Ser. No. 14/559,524, the entirety of which is incorporated by reference herein.

Transmission Scheme

Figure 5:
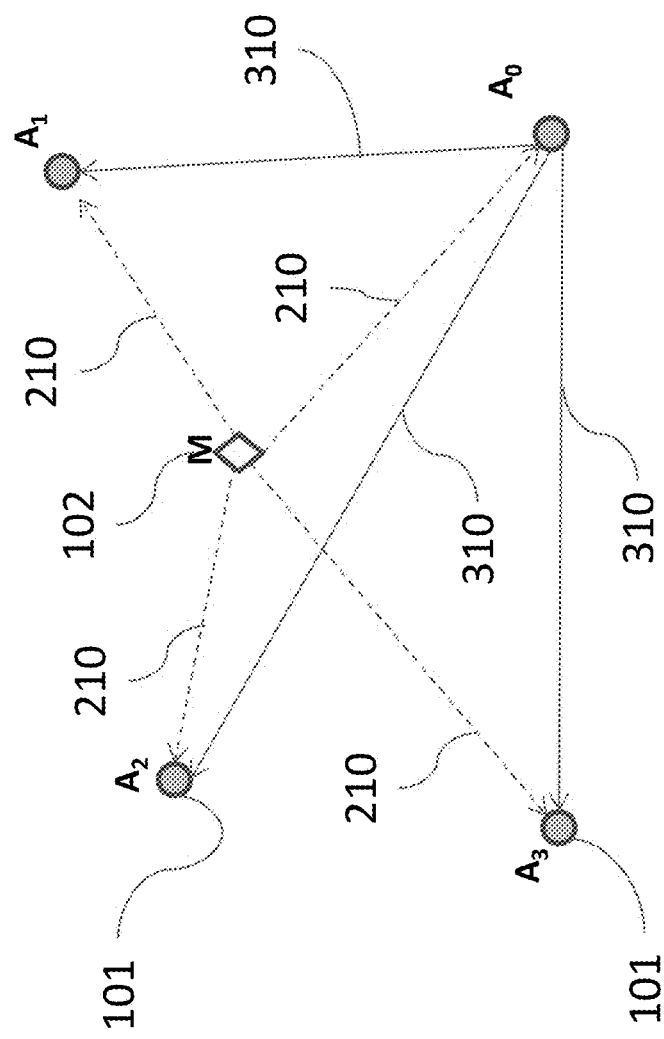
FIG. 5 depicts one embodiment of a TDOA localization method.

FIG. 5 shows an example of an embodiment of the invention. As shown in the figure, anchor nodes 101 (A0 to A3) are within the range of a mobile node M. The identity of each anchor node is determined upon the initial formation of the network. To start the localization process, the mobile device M first broadcasts a request packet (REQ) 210 and the packet is received by anchors 101 (A0 to A3). Upon receiving the REQ packet 210, one of the anchor nodes (e.g., A0) transmits a response packet (RSP) 310. In this example, we assume that anchor nodes A1, A2 and A3 are within the range of A0 as well, and therefore they all receive the RSP packet.

Figure 6:
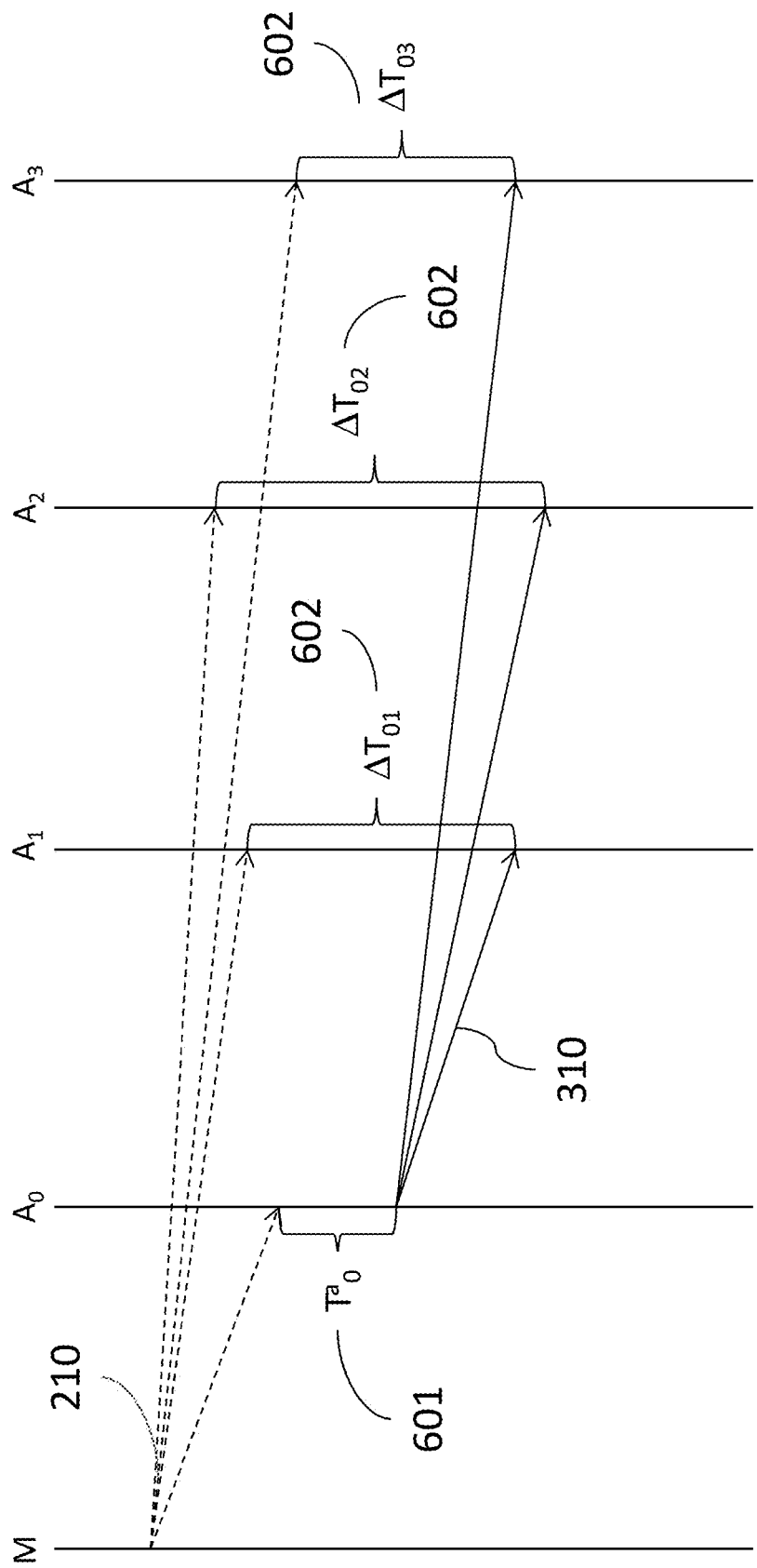
FIG. 6 is a schematic of transmit schedule of the method of FIG. 5, where the first response packet is received by all other anchor nodes.

FIG. 6 is the timing diagram of the example discussed with regards to FIG. 5. Firstly, all anchor nodes record the time, using its own internal timing reference, when the REQ packet is received. We define the delay time at the first anchor A0 between its reception of the REQ packet and its transmission of the RSP packet as turn-around time $T^a_0$ 601. The anchor which transmits the RSP packet calculates the turnaround time $T^a_0$ 601 and announces it to other anchor nodes. The announcement can be embedded in the same RSP packet 310, or in a separate packet. The transmission of the REQ and RSP packets can be randomized so as to avoid collision within the system. Alternatively, the REQ and RSP packets can be deterministically scheduled to avoid collision.

Anchor nodes who receive the RSP packet record the difference of arrival time between REQ packet and RSP packet, the time difference reflecting the difference in time of flight over two paths, for example, from M to $A_1$ and from M to $A_0$ to $A_1$ (including the turnaround time). This time difference, denoted as $\Delta t_{0i}$ 602, is estimated using anchor nodes' internal timing references. Each time difference can be used to locate M on a hyperbolic curve as illustrated in FIG. 3. Multiple time differences can be used to find the location of M as the intersection of multiple curves as illustrated in FIG. 4. This location calculation can be performed on one of the anchor devices, the mobile device, or a server (not shown) that is in wired or wireless communication with the anchor devices as desired. The system can estimate the position of the mobile device based on $\Delta t_{0i}$ 602 and the known anchor locations. The example discussed above assumes that anchor node A0 is within the range of ALL other anchor nodes who also receive the REQ packet.

Figure 7:
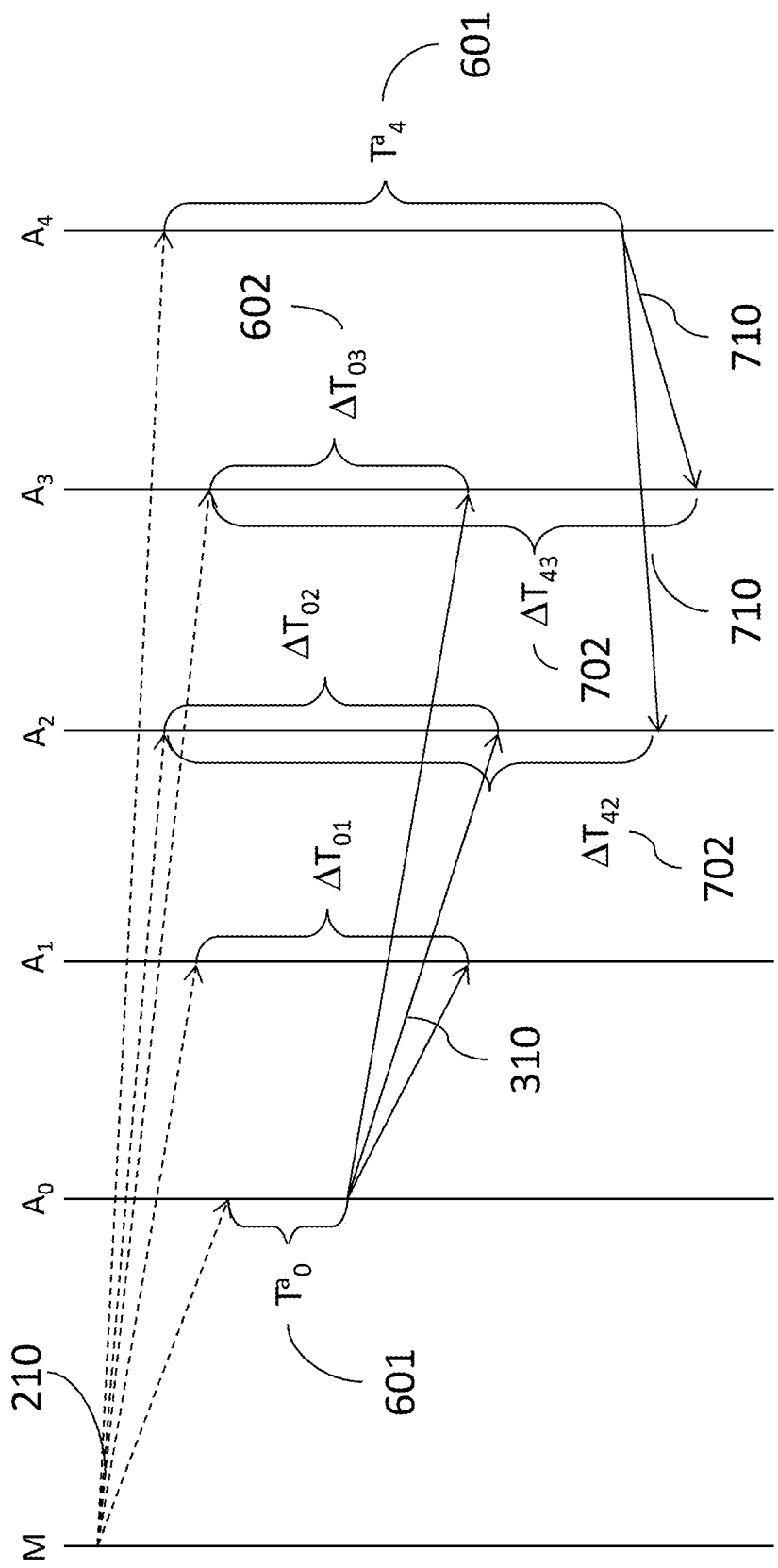
FIG. 7 is a schematic of transmit schedule of a method where more than one response packet is transmitted by anchor nodes.

However, it is not necessarily guaranteed that all anchor nodes are within range of one another in a wireless network. FIG. 7 illustrates another embodiment of the invention for use with a system including anchor nodes that are out of wireless range of one another. Assume, for example, that four anchor nodes A0, A1, A2, A3 and A4, are within the range of node M, also assume that A1, A2 and A3 are in A0's range but A4 is out of A0's range.

The RSP packet transmitted by A0 is received by A1, A2 and A3. They record the first time differences $\Delta t_{01}$, $\Delta t_{02}$, $\Delta t_{03}$, 602 respectively and they will not transmit their own RSP packet. However, since the RSP packet sent by A0 is not received by A4, it transmits its own RSP packet after a random backoff period $T^a_4$ 601. The second RSP packets 710, transmitted by A4, are received by some of the anchor nodes (e.g., A2 and A3). Those anchor nodes which received the second RSP packets will record the second time differences of arrival $\Delta t_{42}$, $\Delta t_{43}$, 702. Similarly, the second responding anchor A4, also reports the turnaround time $T^a_4$ 601. This process stops when all anchor nodes transmit a RSP packet or receive at least one RSP packet.

Location Estimation

The true TDoA, as discussed above, is computed as $$\delta t_{i,j} = \Delta t_{i,j} - T^a_j.$$

In the case where clock offset (SFO) is non-zero, it can be estimated and compensated. For example, $$\delta t_{i,j} = \Delta t_{i,j} - (1-\epsilon_{ij})*T^a_j$$

$$\epsilon_{ij} = \Delta f_{ij}/f = (f_j - f_i)/f,$$

Where $\epsilon_{ij}$ is the estimated relative frequency offset between the transmitting anchor and the receiving anchor normalized by the nominal frequency. (See other prior arts for the SFO estimation).

Given the TDoA and the anchor locations, a mobile device location $\theta_m$ satisfies $$\|\theta_m - \theta_i\| - \|\theta_m - \theta_j\| = \delta_{ij} \cdot \gamma_{ij}$$

Where $\theta_{i,j}$ are the locations of the transmitting anchor $A_i$ and receiving anchor $A_j$, $\gamma_{ij}$ is the distance between the two anchor nodes.

The mobile device location can then be estimated using techniques such as least squares error (LSE) estimation, weighted least squares error estimation, or other algorithms. As an example, least squares estimator is to determine $\theta_m$ such that $$\arg\min_{\theta_m} \Sigma(\|\theta_m - \theta_i\| - \|\theta_m - \theta_j\| - \delta_{ij} + \gamma_{ij})^2 \quad (1)$$

Similarly, a weighted least squares error estimator is to find $\theta_m$ such that $$\arg\min_{\theta_m} \Sigma w_{ij}(\|\theta_m - \theta_i\| - \|\theta_m - \theta_j\| - \delta_{ij} + \gamma_{ij})^2 \quad (2)$$

where $w_{ij}$ is the weight assigned to the corresponding time difference pair.

In certain embodiments, the packets above can be transmitted and received using Ultra Wide-Band (UWB) technology employing frequencies of 500 Mhz or greater. UWB can be effective for short range data communication and can also provide accurate ranging within the systems and methods of the invention. IEEE 802.15.4a provides standards for the use of UWB technology in wireless communications and is incorporated by reference in its entirety herein. While other technologies can be used with the invention, UWB communications can be combined synergistically with the methods and systems of the invention to provide an intelligent, high precision, real-time location service that can handle a large number of moving devices.

Anchor nodes and mobile devices useful with the invention can be constructed using special purpose or commercial off-the-shelf parts. In general, the devices will need to have a processor, a memory storing instructions for the processor and/or data, and a transceiver for transmitting and/or receiving packets. In the case of anchor nodes, these can be installed with building mains power, so size and power usage can be less important than for the mobile device. The mobile device can be configured, for example, as a tag that can be attached to various items for tracking purposes. Accordingly, the tag should be small in size and have an optimized power consumption since the tag will likely be battery powered. In addition, while in some embodiments, the tag may only need to receive signals, it may still employ a transceiver as the receiver on the tag.

One example of a hardware implementation that might be useful with the invention is the STM32W108C8 high-performance IEEE 802.15.4 wireless system-on-chip with flash memory available from STMICROELECTRONICS (www.st.com). This chip includes a processor, memory, transceiver, timer and other circuitry useful in implementing the invention. In other embodiments, in particular, in UWB embodiments, a UWB transceiver such as the DW1000 SENSOR from DECAWAVE, Ltd. (www.decawave.com) can be employed as the transceiver in the mobile device or anchor node. This device can communicate with a processor for instructions and/or data storage. Other commercial or purpose built hardware could also be employed in addition to or in place of such systems.

Advantages

Advantages of the invented TDoA scheme disclosed herein may include that a mobile device only needs to transmit a REQ packet. The system allows the mobile devices to be built with very low complexity and operate with very low average power consumption. Another advantage realized by the disclosed system is that the anchor devices do not need to synchronize with each other. It eliminates the need for additional wiring or additional timing synchronization operations wirelessly. As a result, the system performance will be more robust to clock frequency offset.

Although the invention has been described by way of examples of preferred embodiments, it is to be understood that various adaptations and modifications may be made within the spirit of the scope of the invention. Therefore, it is the object of the appended claims to cover all such variations and modifications as come within the true spirit and scope of the invention.

We claim:

1. A method for locating a mobile device in a network having a plurality of anchor nodes in wireless communication with a plurality of mobile devices, comprising:
    transmitting a request (REQ) packet by the mobile device;
    receiving the REQ packet by a plurality of anchor nodes;
    transmitting, by a first one of the plurality of anchor nodes receiving the REQ packet, a first first response (RSP1) packet;
    receiving by at least some of the anchor nodes the REQ packet and the RSP1 packet;
    wherein, for anchor nodes that receive both the REQ packet and the RSP1 packet, determining a difference in arrival time between receiving the REQ packet and the RSP1 packet;
    and, for a second one of the plurality of anchor nodes receiving the REQ packet that did not receive the RSP1 packet after a backoff period,
    transmitting, by the second one of the plurality of anchor nodes a second response (RSP2) packet,
    wherein, for anchor nodes that receive both the REQ packet and the RSP2 packet, determining a difference in arrival time between receiving the REQ packet and the RSP2 packet; and
    determining the location of the mobile device based on the determined differences in arrival time.

2. The method of claim 1, wherein the turnaround time between receiving the REQ packet and transmitting the RSP1 packet is embedded in the RSP1 packet.

3. The method of claim 1, where the turnaround time between receiving the REQ packet and transmitting the RSP1 packet is predetermined and not transmitted.

4. The method of claim 1, where the transmission of the REQ and the RSP1 packets are randomized to avoid collision.

5. The method of claim 1, where the transmission of the REQ and the RSP1 packets are deterministically scheduled to avoid collision.

6. The method of claim 1, wherein the identities of the anchor nodes that transmit the RSP1 packets are determined during formation of the network.

7. The method of claim 1, wherein an estimation of the location of the mobile device is carried out using at least one of a least squares algorithm, a weighted least squares algorithm, or a Kalman filtering algorithm.

8. The method of claim 1, wherein the process of sending the RSP packet is repeated more than twice, if there are still anchor nodes receiving the REQ packet that did not receive RSP packets.

9. The system of claim 1, wherein an estimation of the location of the mobile device is carried out using at least one of a least squares algorithm, a weighted least squares algorithm, or a Kalman filtering algorithm.

10. The system of claim 1, wherein the process of sending the RSP packet is repeated more than twice, if there are still anchor nodes receiving the REQ packet that did not receive RSP packets.

11. A system for locating a mobile device in a network having a plurality of anchor nodes in wireless communication with a plurality of mobile devices, comprising:
a mobile device having a processor and a receiver;
at least three transceiver devices forming a network of anchor nodes, each transceiver having a processor and a receiver for sending and receiving communication packets;
wherein the mobile device and anchor nodes are configured to:
transmit a request (REQ) packet by the mobile device;
receive the REQ packet by a plurality of anchor nodes;
transmit, by a first one of the plurality of anchor nodes receiving the REQ packet, a first response (RSP1) packet; and,
receive by at least some of the anchor nodes the REQ packet and the RSP1 packet;
and, for a second one of the plurality of anchor nodes receiving the REQ packet that did not receive the RSP1 packet after a backoff period,
transmitting, by the second one of the plurality of anchor nodes a second response (RSP2) packet,
wherein, for anchor nodes that receive both the REQ packet and the RSP2 packet, determining a difference in arrival time between receiving the REQ packet and the RSP2 packet;
and, wherein the system is configured to determine the location of the mobile device based on the determined differences in arrival time.

12. The system of claim 11, wherein the turnaround time between receiving the REQ packet and transmitting the RSP1 packet is embedded in the RSP1 packet.

13. The system of claim 11, where the turnaround time between receiving the REQ packet and transmitting the RSP1 packet is predetermined and not transmitted.

14. The system of claim 11, where the transmission of the REQ and the RSP1 packets are randomized to avoid collision.

15. The system of claim 11, where the transmission of the REQ and the RSP1 packets are deterministically scheduled to avoid collision.

16. The system of claim 11, wherein the identities of the anchor nodes that transmit the RSP1 packets are determined during formation of the network.

17. The system of claim 11, wherein the first one of the plurality of anchor nodes receiving the REQ packet is further configured to repeat transmitting the RSP1 packet at least once, if there are still anchor nodes receiving the REQ packet that did not receive RSP1 packet.

* * * * *